(12) United States Patent
Kumaran et al.

(10) Patent No.: US 10,789,001 B1
(45) Date of Patent: Sep. 29, 2020

(54) POSTED OPERATION DATA CONTROL

(71) Applicant: Innovium, Inc., San Jose, CA (US)

(72) Inventors: Mani Kumaran, San Jose, CA (US);
Mohammad Kamel Issa, Los Altos, CA (US); Gururaj Ananthateerta, Santa Clara, CA (US)

(73) Assignee: Innovium, Inc., San Jose, CA (US)

( * ) Notice: Subject to any disclaimer, the term of this patent is extended or adjusted under 35 U.S.C. 154(b) by 510 days.

(21) Appl. No.: 15/357,464

(22) Filed: Nov. 21, 2016

(51) Int. Cl.
*G06F 13/36* (2006.01)
*G06F 3/06* (2006.01)
*G06F 13/42* (2006.01)

(52) U.S. Cl.
CPC .......... *G06F 3/0635* (2013.01); *G06F 3/0611* (2013.01); *G06F 3/0659* (2013.01); *G06F 3/0673* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 5,822,568 A * | 10/1998 | Swanstrom | ............. | G06F 13/28 703/24 |
| 6,393,535 B1 * | 5/2002 | Burton | ................... | G06F 3/0613 711/154 |
| 8,072,901 B1 * | 12/2011 | Blair | ....................... | H04L 45/00 370/254 |
| 2004/0260891 A1 * | 12/2004 | Jeddeloh | .............. | G11C 7/1006 711/154 |
| 2008/0126885 A1 * | 5/2008 | Tangvald | ............ | G06F 11/1076 714/54 |
| 2010/0153631 A1 * | 6/2010 | Moon | ................. | G06F 12/0246 711/103 |
| 2012/0102245 A1 * | 4/2012 | Gole | ..................... | G06F 13/385 710/72 |
| 2016/0378709 A1 * | 12/2016 | Menachem | ......... | G06F 13/4282 710/308 |

OTHER PUBLICATIONS www.computerweekly.com, Write-through, Write-around, Write-back, Cache explained, Apr. 2014, p. 1-6 (Year: 2014).*

* cited by examiner

*Primary Examiner* — Henry Tsai
*Assistant Examiner* — Dean Phan
(74) *Attorney, Agent, or Firm* — Fish & Richardson P.C.

(57) ABSTRACT

Methods, systems, and apparatus, including a managed device comprising memory storage, one or more control registers, and circuitry to perform operations of receiving, from a control system, one or more posted write operations directed to the one or more control registers; based on the one or more posted write operations, storing in the one or more control registers, data specifying at least a system address of a memory of the control system, where the system address corresponds to a starting address of a predetermined section of the memory; and transferring managed device data from the memory storage to the predetermined section of the memory of the control system by issuing, to the control system and based on the system address of the memory, one or more posted write operations to write the managed device data to the predetermined section of the memory.

29 Claims, 6 Drawing Sheets

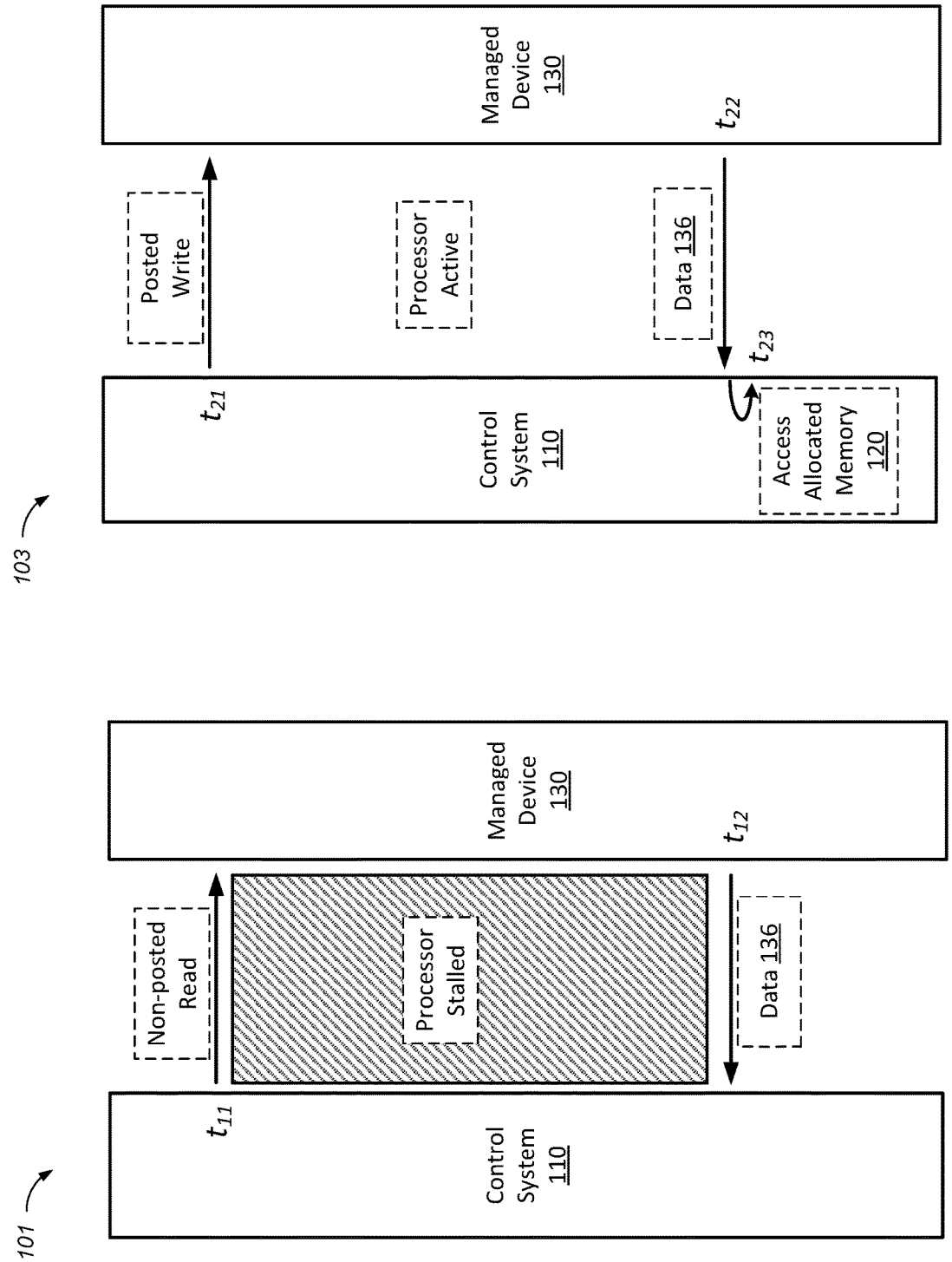

POSTED OPERATION DATA CONTROL

BACKGROUND

This specification relates to management data transfer between a control system and one or more managed devices through a communication interface such as a peripheral component interconnect express (PCIe) interface.

SUMMARY

A control system may manage one or more managed devices through a standard protocol. For example, a server may manage access control lists (ACL) and other configurations of one or more network switches through the PCIe protocol, where communications between a control system and a PCIe endpoint, e.g., a network switch, are exchanged using packets. The PCIe endpoint device is typically registered on the System Memory Map. After a processor of the control system issues a PCIe memory write request to a PCIe endpoint to write data to a memory of the PCIe endpoint, the processor may continue processing other tasks without delays. On the other hand, after a processor of the control system issues a Programmed I/O (PIO) command that launches a PCIe read request to a PCIe endpoint to retrieve data stored in the PCIe endpoint, the processor pipeline is generally stalled until the requested data is returned from the PCIe endpoint. In general, a data portion of a PIO triggered PCIe packet has a fixed size, e.g., 4 bytes. However, in the context of network management, an ACL entry may have a larger size, e.g., 1024 bytes. Conventionally, if a processor of a server is instructed to read an ACL entry of a network switch by a program, the processor would issue 256 consecutive PCIe reads to the network switch, and the accumulated latency would create a performance bottleneck for the processor. As another example, in a network management application, a control system may be programmed to monitor the status of a port periodically. Conventionally, the control system may issue non-posted reads to the managed device periodically. The periodic issuing of non-posted read operations by the processor may create a further performance bottleneck for the processor because of the periodic latency. As another example, when an issue, e.g., an exception, occurs in a managed device, the managed device may send an interrupt to the control system. Conventionally, the control system may issue a non-posted read operation to the managed device to retrieve the exception code, which may create further latency. According to one innovative aspect of the subject matter described in this specification, using posted write operations, a PCIe endpoint or other such device may write the stored data back to configured locations of a system memory of the control system. The processor of the control system may then read data directly from the system memory or processor cache, which reduces the latency and improves the control system performance.

Moreover, the PCIe address mapping scheme may not be optimal for all applications. For example, if the PCIe address mapping scheme uses a 4-byte increment for each address, it would be inefficient to manage 256 PCIe addresses for a single 1024-byte ACL entry. As another example, it may be desirable to keep the requested size of a base address register (BAR) small. Under the PCIe address mapping scheme, a first 1024-byte ACL entry may have a starting PCIe address of 0x0000000, while the next 1024-byte ACL entry may have a starting PCIe address of 0x00001000. As another example, each entry stored in a managed device may have different sizes. An ACL entry may have a size of 1024 bytes, while a port status entry may have a size of 8 bytes. The PCIe address mapping scheme therefore may not be optimal and managing the address map for tracking different entries stored in the managed device would be a complex task. According to another innovative aspect of the subject matter described in this specification, by managing an entry address mapping scheme that maps to the PCIe address mapping scheme, variable sized addressed entries may be accessed by a control system without complicating the managed device address map.

In general, one innovative aspect of the subject matter described in this specification can be embodied in a system including one or more computers. The one or more computers include a processor; a memory; an interconnect interface configured to provide a first interconnect path from the processor to memory; a second interconnect path from the processor to a managed device; and a third interconnect path from the managed device to the processor or to the memory, where a latency associated with the first interconnect path is lower than a latency associated with the second interconnect path. The system includes a computer-readable medium having stored thereon instructions that, when executed by the one or more computers, cause the one or more computers to perform operations of issuing, via the second interconnect path to a managed device, one or more posted write operations to read managed device data stored in managed device; receiving, via the third interconnect path, the managed device data sent by the managed device in response to the managed device receiving the one or more posted write operations; storing, to a predetermined section of the memory, the managed device data; determining that the managed device data is stored in the predetermined section of the memory; and in response to determining that the managed device data is stored in the predetermined section of the memory, accessing, via the first interconnect path, the managed device data stored in the predetermined section of the memory.

Implementations may include one or more of the following features. To issue the one or more posted write operations, one or more posted write operations may be issued to the managed device to write a system address of the memory to one or more system address registers of the managed device, where the system address corresponds to a starting address of the predetermined section of the memory. The system address of the memory may have a first length. A first posted write operation may be issued to the managed device to write a first portion of the system address to a first system address register of the one or more system address registers. A second posted write operation may be issued to the managed device to write a second portion of the system address to a second system address register of the one or more system address registers.

To issue the one or more posted write operations (by the managed device?), a posted write operation may be issued to the managed device to write to the managed device, a data address of a memory section of the managed device where the managed device data is stored. Another posted write operation may be issued to the managed device, command data that when retrieved by the managed device, causes the managed device to perform operations of interpreting that the command data corresponds to a read command; accessing the data address stored in the managed device; retrieving the managed device data based on the data address; accessing a system address stored in the managed device; and based on the system address, issuing one or more posted write commands to write the managed device data to the predetermined section of the memory.

To issue the one or more posted write operations, a posted write operation may be issued to the managed device to write writeback enable data to the managed device, wherein the writeback enable data indicates whether a posted write operation to write the managed device data by the managed device to the memory is enabled.

An interrupt operation may be received by the processor from the managed device. A portion of the predetermined section of the memory may be designated for storing an interrupt code sent by the managed device in response to an exception in the managed device. After receiving the interrupt operation, the interrupt code stored in the portion of the predetermined section of the memory may be accessed. The exception that has occurred in the managed device may be determined based on the interrupt code.

To access the managed device data stored in the predetermined section of the memory, the processor may periodically access the managed device data stored in the predetermined section of the memory based on a predetermined timer value. To determine that the managed device data is stored in the predetermined section of the memory, the processor may access a status section of the memory to obtain status data. Based on the status data, it may be determined that the managed device data is available in the predetermined section of the memory. The memory may include a system memory, a cache that is separate from the system memory, or a cache that is a part of the system memory.

The interconnect interface may be a peripheral component interconnect express (PCIe) root complex, and the one or more posted write operations may be one or more PCIe posted write operations. To issue the one or more posted write operations, the one or more PCIe posted write operations may be issued in response to the system executing a read command defined by an application programming interface, where the read command is called by an application that manages a network switching control scheme implemented on the managed device.

In general, another innovative aspect of the subject matter described in this specification can be embodied in a managed device including memory storage, one or more control registers, and circuitry to perform operations of receiving, from a control system, one or more posted write operations directed to the one or more control registers; based on the one or more posted write operations, storing in the one or more control registers, data specifying at least a system address of a system memory of the control system, where the system address corresponds to a starting address of a predetermined section of the system memory; and transferring managed device data from the memory storage to the predetermined section of the system memory of the control system by issuing, to the control system and based on the system address of the system memory, one or more posted write operations to write the managed device data to the predetermined section of the system memory, whereby a latency associated with accessing the managed device data from the predetermined section of the system memory by a processor of the control system is lower than a latency associated with accessing the managed device data by the processor by issuing a non-posted read operation to the managed device.

Implementations may include one or more of the following features. A posted write operation may be received to write, to a query address register of the managed device, a data address of a memory location in the managed device where the managed device data is stored. A posted write operation may be received to write, to a command register of the managed device, command data. The managed device may obtain the command data stored in the command register; and determine that the command data corresponds to a read command. To transfer the managed device data, the data address stored in the query address register may be accessed in response to determining that the command data corresponds to a read command. The managed device data may be retrieved based on the data address.

Based on the data address and an address map, multiple physical data addresses that correspond to multiple memory locations where different portions of the managed device data are stored may be identified. Multiple posted write operations may be issued to write consecutively the different portions of the managed device data to different addresses in the predetermined section of the system memory.

After issuing the one or more posted write operations, an interrupt operation may be issued to the control system. The one or more posted write operations from the control system may include a posted write operation for writing a timer value in a writeback timer register of the managed device. In response to receiving the posted write operation for writing the timer value in the writeback timer register, the timer value in the writeback timer register may be written. Posted write operations to write the managed device data to the predetermined section of the system memory may be periodically written based on the timer value.

The subject matter described in this specification can be implemented in particular embodiments so as to realize one or more of the following advantages. Using posted write operations to enable a managed device to write the stored data back to the control system reduces idling time of the control system processor, reduces latencies for accessing stored data, and improves the performance of the overall system and in particular that of the processor. As the processor is capable of handling more tasks, the quality of service for the device management also improves and the control system can be built using fewer processor cores. Using writeback operations to store exception code in the control system allows exceptions to be defined and managed by the control system in a flexible manner. Using a separate indirection address space to manage variable-sized entries allows a reduction in BAR size without complicating the PCIe system memory map of the managed device. It also simplifies the control system software that needs to store and manage the addresses of these variable-sized entries since now all entries reside at incremental device addresses regardless of size.

The details of one or more implementations are set forth in the accompanying drawings and the description below. Other features, aspects, and advantages will become apparent from the description, the drawings, and the claims.

BRIEF DESCRIPTION OF THE DRAWINGS

FIGS. 1B and 1C illustrate example operations of a data processing system.

Like reference numbers and designations in the various drawings indicate like elements. It is also to be understood that the various exemplary embodiments shown in the figures are merely illustrative representations and are not necessarily drawn to scale.

DETAILED DESCRIPTION

Figure 1A:
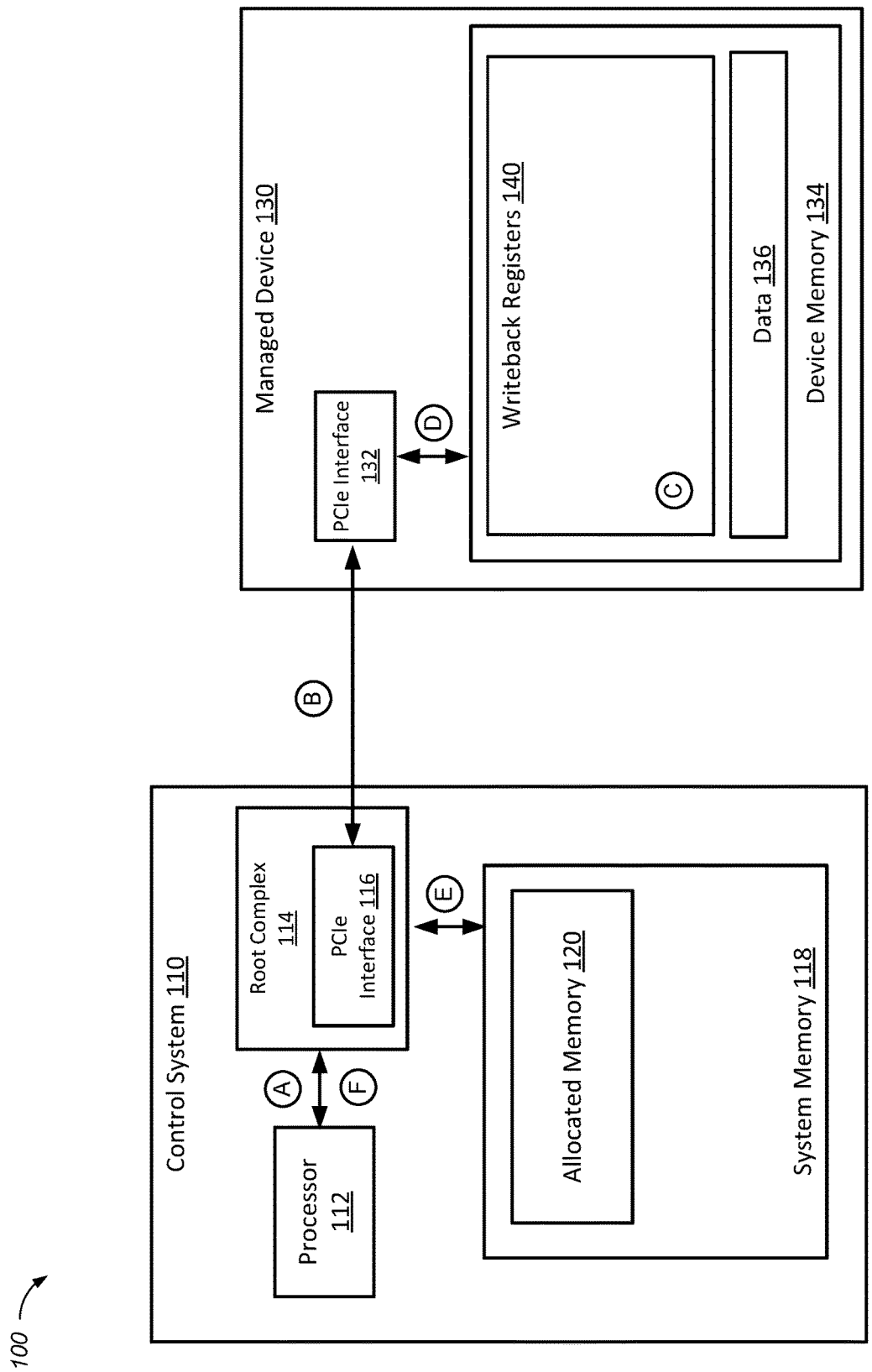
FIG. 1A is a block diagram of an example data processing system.

FIG. 1A is a block diagram of an example data processing system 100 that provides data control between a control system 110 and a managed device 130 using PCIe operations. For example, the data processing system 100 may be a network management platform with multiple network switches connected to a server that manages network access controls performed by the network switches. In general, the data processing system 100 provides a data processing environment that enables the control system 110 to control data reads and writes on one or more managed devices that communicate with the control system 110 using a communications protocol, where the communications protocol supports posted and non-posted operations. In this disclosure, the control system 110 communicates with the managed device 130 using the PCIe protocol, but the disclosure is applicable to other data processing environments where other suitable communications protocols may be used, where posted and non-posted operations are used to control data reads and writes in a managed device.

In general, the control system 110 is configured to control data reads and writes on the managed device 130 using a communications protocol, e.g., the PCIe protocol. The control system 110 may be a server or any other suitable computing device or system that supports the PCIe protocol. In some implementations, the control system 110 may be configured to run an application that provides a user interface to enable a user to control the data reads and writes on the managed device 130. For example, a user may write data to or read data from the managed device 130 through a set of commands defined by an application programming interface (API) that is supported by the control system 110. The API may be application-specific. For example, an API for network management may provide a set of commands that would enable a network administrator to use the control system 110 to create, remove, read, or modify an entry for an access control list of a network switch, or to check the status of a requested functional operation in any managed device, among other functions. The control system 110 includes a processor 112, a root complex 114, and a system memory 118.

In general, the processor 112 issues commands to control data stored on the managed device 130. In some implementations, the processor 112 issues commands based on an application developed using an API. The processor 112 may be a 32-bit general-purpose central processing unit (CPU), a 64-bit general-purpose CPU, an application-specific processor, or any other types of suitable processors. The processor 112 communicates with the managed device 130 and the system memory 118 through the root complex 114.

The root complex 114 connects the processor 112 and system memory 118 to PCIe-enabled devices including the managed device 130 by providing interconnect paths among the processor 112, system memory 118, and the PCIe-enabled devices. For example, the root complex 114 may provide an interconnect path from the processor 112 to the managed device 130. As another example, the root complex 114 may provide an interconnect path from the processor 112 to the system memory 118. As another example, the root complex 114 may provide an interconnect path from the managed device 130 to the system memory 118 and/or the processor 112. The root complex 114 may be connected to the processor 112 by a front-side bus interconnect (FSB), a QuickPath Interconnect (QPI), a UltraPath Interconnect (UPI), or any other suitable interconnect bus. The root complex 114 may be connected to the system memory 118 by a double data rate (DDR) bus or any other suitable interconnect bus. The root complex 114 may connect to the managed device 130 through a PCIe interface 116. Although not shown in FIG. 1A, the root complex 114 may also be connected to multiple PCIe-enabled devices and/or a PCIe switch that is connected to multiple PCIe-enabled devices and/or a PCIe bridge that is connected to multiple PCI/PCI-X-enabled devices.

The root complex 114 includes the PCIe interface 116. The PCIe interface 116 includes circuitry and logic configured to transmit, process, and receive PCIe packets. Based on commands received from the processor 112, the PCIe interface 116 may generate PCIe operations to transmit to the managed device 130 or may generate DMA operations to control data in the system memory 118. The PCIe interface 116 receives PCIe operations from the managed device 130. Based on the PCIe operations received from the managed device 130, the root complex 114 may generate DMA operations to control data in the system memory 118.

The system memory 118 may be a memory device integrated with the processor 112 and the root complex 114 on a common platform, or a memory subsystem. The system memory 118 may be addressed using the same addressing scheme as the device memory 134 of the managed device 130. For example, the system memory 118 may be addressed using the PCIe address mapping scheme. The system memory 118 includes a section of allocated memory 120. The allocated memory 120 is configured to store data that is written back by the managed device 130. Different types of data may be mapped to different addresses of the allocated memory 120. For example, an ACL entry written by the managed device 130 may be mapped to an address 0x00000000 of the allocated memory 120, and an interrupt code written by the managed device 130 may be mapped to an address 0x00010000 of the allocated memory 120. The size, the address scheme, the mapping, and other properties of the allocated memory 120 may be defined and managed using an API. Although not shown in FIG. 1A, in some other implementations, the allocated memory 120 may be a cache in the processor 112. In some other implementations, the allocated memory 120 may be a cache integrated with the system memory. In some other implementations, the allocated memory 120 may be a combination of a part of the system memory and a cache that is either integrated with the system memory or in the processor.

In some implementations, the control system 110 may allow the managed device 130 to write to the allocated memory 120 but not allow the managed device 130 to write to other portions of the system memory 118. For example, the root complex 114 may control permissions to access the system memory 118 by the managed device 130. In some implementations, the control system 110 may not allow the managed device 130 to write to the allocated memory 120 unless a writeback capability is enabled on the managed device. For example, to enable a query writeback capability on the managed device, the control system 110 may issue a posted write operation to a register of the writeback registers 140 that is designated for this purpose. After the control system 110 may issue the posted write operation, the control system 110 may modify a permission control of the allocated memory 120 to allow the managed device 130 to write data to the allocated memory 120 through the root complex 114.

The managed device 130 may be any suitable PCIe endpoint device. As an example, the managed device 130 may be a network switch that maintains an ACL to receive, process and forward data packets, a network controller, or any suitable peripheral device. The managed device 130 includes a PCIe interface 132. Similar to the PCIe interface 116, the PCIe interface 132 includes circuitry and logic configured to transmit, process, and receive PCIe packets. The PCIe interface 132 may be connected to the device memory 134 by a double data rate (DDR) bus or any other suitable interconnect bus. Based on PCIe operations received from the control system 110, the PCIe interface 132 may generate DMA operations to control data in the system memory 118 and/or generate PCIe operations to write data to the allocated memory 120 of the control system 110.

The device memory 134 may be a memory device integrated with the managed device 130 on a common platform, or a separate memory subsystem. The device memory 134 may be addressed using the PCIe address mapping scheme. The device memory 134 includes data 136 and a section of writeback registers 140. An example of the data 136 is an ACL entry. The writeback registers 140 include a plurality of data registers. As described in more detail in reference to FIG. 1D, the writeback registers 140 include registers that may be accessed by the managed device 130 to determine the writing to the data 136 back to the allocated memory 120. The size, the address scheme, the address mapping, and other properties of the data 136 and the writeback registers 140 in the device memory 134 may be defined using an API.

FIG. 1A further illustrates an example flow of data, shown in stages (A) to (F). Stages (A) to (F) may occur in the illustrated sequence, or they may occur in a sequence that is different than in the illustrated sequence. During stage (A), the processor 112 intends to read the data 136 stored in the device memory 134 of the managed device 130 and issues a PIO write command. During stage (B), the root complex 114 generates one or more packets that specify one or more posted write operations to write data to one or more registers of the writeback registers 140, and transmits the packets to the managed device 130 through the PCIe interface 116.

During stage (C), the managed device 130 writes data to the one or more registers of the writeback registers 140. As described in more detail in reference to FIG. 1D, based on the data stored in the writeback registers 140, the managed device 130 determines that the processor 112 has issued a read command to read the data 136 stored in the device memory 134.

During stage (D), the managed device 130 reads the data 136 stored in the device memory 134, and requests the PCIe interface 132 to generate a posted write operation to write the data 136 to the allocated memory 120. As described in more detail in reference to FIG. 1D, one or more registers of the writeback registers 140 include data specifying an address in the allocated memory 120 where the data 136 is to be written back to.

During stage (E), the PCIe interface 132 transmits one or more posted write operations to the root complex 114, and the root complex 114 writes the data 136 to the allocated memory 120. During stage (F), the processor 112 reads the data 136 from the allocated memory 120. Alternately, during stage (E), the PCIe interface 132 may issue a posted write operation, and the root complex 114 may write the data 136 directly to the processor cache. Subsequently, during stage (F), the processor 112 reads the data 136 from the processor cache avoiding a further penalty of a cache miss.

An advantage of using posted write operations to read data is illustrated through a comparison between example operations as described in FIGS. 1B and 1C. FIG. 1B illustrates example operations of a data processing system 101 that accesses data using a non-posted operation. At time $t_{11}$, the control system 110 issues a PCIe non-posted read operation to the managed device 130 to read data 136. At time $t_{12}$, the managed device 130 returns the data 136 to the control system 110. Since the PCIe read operation is a non-posted operation, the processor 112 is stalled and cannot perform any tasks between time $t_{11}$ and $t_{12}$. The stalled time is a latency, which affects the overall performance of the data processing system. In general, each PCIe read operation retrieves a fixed size of data, e.g., 4 bytes. If a total size of a data entry is long, the control system 110 would be required to issue multiple PCIe read operations, and the accumulated latency may become a performance bottleneck. For example, retrieving a 1024-byte ACL entry would require 256 PCIe read operations. If each PCIe read operation introduces a latency of several microseconds, the accumulated delay for reading the 1024-byte ACL may be close to a millisecond. In a networking management application or another application where the accessing of data entries is frequent, an improvement of this performance bottleneck would be desirable.

FIG. 1C illustrates example operations of a data processing system 103 that accesses data using a posted operation. At time $t_{21}$, the control system 110 issues a PCIe posted write operation to the managed device 130 to request the managed device 130 to write the data 136 back to the allocated memory 120. Since the PCIe write operation is a posted operation, the processor 112 is not stalled, and may perform other tasks between time $t_{21}$ and $t_{22}$. At time $t_{22}$, the managed device 130 issues a PCIe posted write operation to write the data 136 back to the control system 110. At time $t_{23}$, the processor 112 accesses the allocated memory 120 using a DMA read operation through the root complex 114. In general, a DMA read operation has a latency in the order of nanoseconds. Retrieving a 1024-byte ACL entry would require 256 PCIe read operations, and the accumulated delay for reading the 1024-byte ACL may be close to a microsecond, which is much lower than the millisecond accumulated delay as described in reference to FIG. 1B.

Figure 1D:
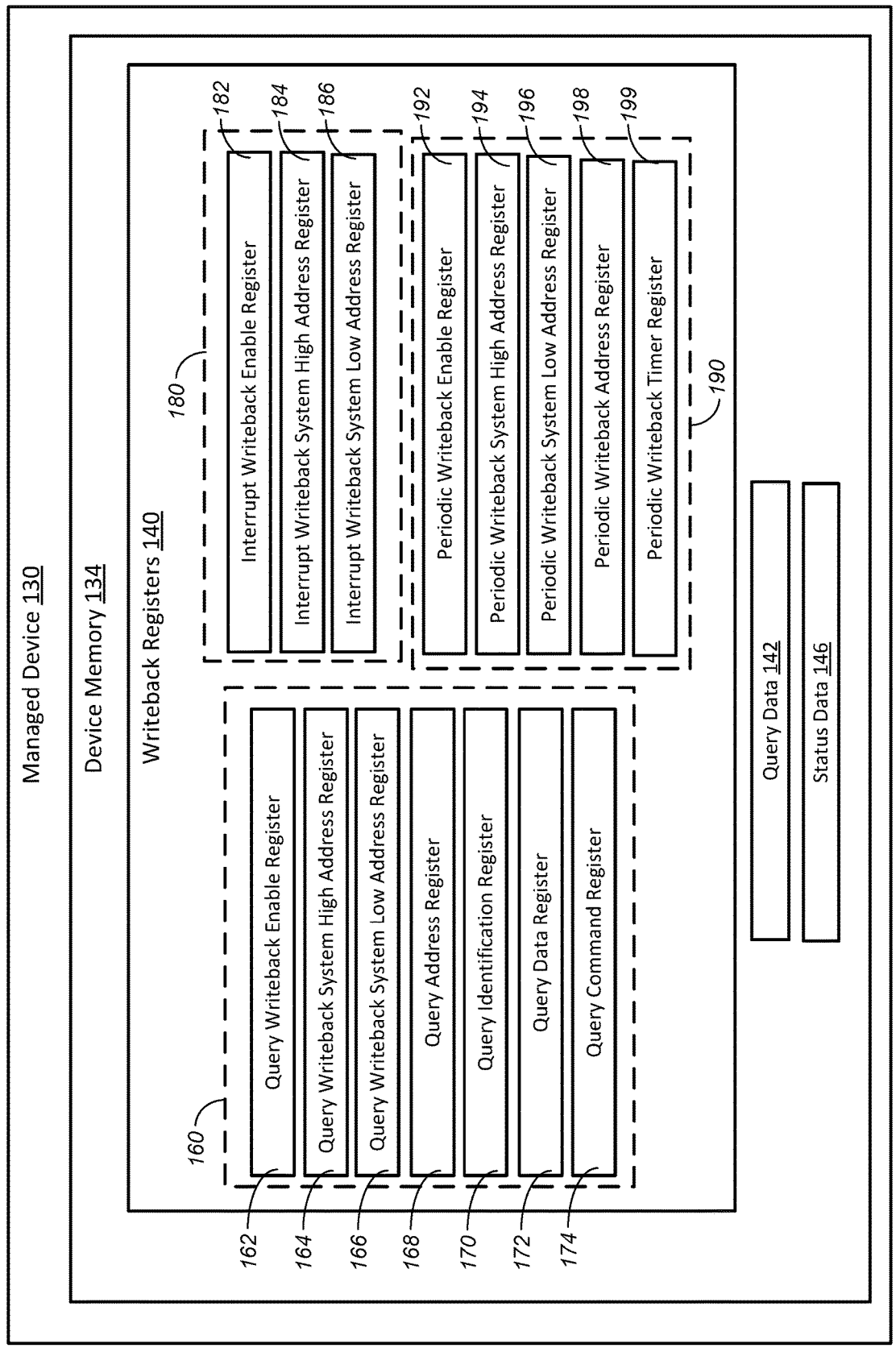
FIG. 1D is a block diagram of an example managed device.

FIG. 1D is a block diagram of an example managed device 130 that illustrates example data registers of the writeback registers 140. In this example, the writeback registers 140 include query writeback registers 160, interrupt writeback registers 180, and periodic writeback registers 190. Each register has a corresponding address, e.g., PCIe address and a corresponding data value, e.g., a 4-byte value.

In general, the query writeback registers 160 enable the managed device 130 to respond to one or more posted write operations issued by the control system 110 to read data, e.g., query data 142, that is stored in the device memory 134. The query writeback registers 160 include a query writeback enable register 162, a query writeback system high address register 164, a query writeback system low address register 166, a query address register 168, a query identification register 170, a query data register 172, and a query command register 174.

The query writeback enable register 162 indicates whether the query writeback capability is enabled on the managed device 130. The data value in the query writeback enable register 162 may be defined by a posted write operation issued by the control system 110, or may be defined through an API command. If the managed device 130 accesses the query writeback enable register 162 and determines that the query writeback is disabled, in response to receiving a posted write operation from the control system 110 to read the query data 142, the managed device 130 would not perform a posted write operation to write query data 142 back to the control system 110. In some implementations, the managed device 130 may instead issue an interrupt notifying the control system 110 that an exception has occurred.

The query writeback system high address register 164 indicates a higher portion of the system address for writing back the query data 142. For example, the control system 110 may be running on a 64-bit operating system, while the managed device 130 may be running on a 32-bit operating system. The query writeback system high address register 164 would be configured to store bit 33 to 64 of the system address in the allocated memory 120 that the query data 142 is configured to be written to. The data value in the query writeback system high address register 164 may be defined by a posted write operation issued by the control system 110, or may be defined through an API command.

The query writeback system low address register 166 indicates a lower portion of the system address for writing back the query data 142. For example, the control system 110 may be running on a 64-bit operating system. The query writeback system low address register 166 would be configured to store bit 1 to 32 of the system address in the allocated memory 120 that the query data 142 is configured to be written to. The data value in the query writeback system low address register 166 may be defined by a posted write operation issued by the control system 110, or may be defined through an API command. In some other implementations, if the control system 110 is running on a 32-bit operating system, only the query writeback system low address register 166 would need to be defined and not the query writeback system high address register 164.

The query address register 168 indicates an address of the query data 142 in the device memory 134. The data value in the query address register 168 may be defined by a posted write operation issued by the control system 110, or may be defined through an API command. As described in more detail in reference to FIG. 2, in some implementations, the address stored in the query address register 168 may be mapped to an address in a PCIe-space address map. In some other implementations, the address stored in the query address register 168 may be mapped to an address in an application-space address map.

The query identification register 170 indicates an identification of the query from the control system 110. For example, if multiple threads are running concurrently on the control system 110, the control system 110 may assign an identification to each running thread. When the managed device 130 writes the query data 142 back to the control system 110, the managed device 130 may also write back the identification of the query, such that the control system may verify that the query data 142 is the data requested by the corresponding thread. The data value in the query identification register 170 may be specified in a header of a posted write operation issued by the control system 110.

The query data register 172 stores data to be written back to the control system 110. For example, the query data register 172 may store the data value of the query data 142, such that the managed device 130 may use the stored data to generate the posted write packet. In some implementations, the query data register 172 may store data sent from the control system 110. For example, the managed device 130 may support a read-modify-write command, where the memory location that stores the query data 142 would be updated with a new value provided by the control system 110 after the query data 142 is read. The query data register 172 may be used to store the new value.

The query command register 174 indicates a type of commands from the control system 110. For example, after the managed device 130 receives a posted write command from the control system 110, the managed device 130 may read the query command register 174 to determine that the processor 112 has issued a read command. When the managed device 130 writes the query data 142 back to the control system 110, the managed device 130 may also write back the identification of the query, such that the control system may verify that the query data 142 is the data requested by the corresponding thread. The data value in the query writeback system high address register 164 may be defined by a posted write operation issued by the control system 110, or may be defined through an API command.

As an example to illustrate a query writeback sequence, the control system 110 may first enable query writeback by writing data in the query writeback enable register 162 that would enable a query writeback on the managed device 130. The control system 110 may then program the query writeback system high address register 164 and the query writeback system low address register 166 to set the system address of the allocated memory 120 for storing the query data 142. The control system 110 may then program the query address register 168 to set the address of the query data 142 in the device memory 134. The address may be mapped in a PCIe-space address map or an application-space address map. The control system 110 may then program the query identification register 170 to specify an identification of the query. The control system 110 may then program the query data register 172. The control system 110 may then program the query command register 174 to specify a read, write, or other commands.

Upon receiving the posted write command, the managed device 130 accesses data in the query command register 174 to decode the command sent by the processor 112. In response to determining that the command is a read command, the managed device 130 may access data stored in the query address register 168 to determine an address of the query data 142. Based on the address, the managed device 130 then queries the device memory 134, e.g., using a DMA command, to read the query data 142. After obtaining the query data 142, the managed device 130 issues a posted write operation to write the query data 142 to the allocated memory 120 based on the address data stored in the query writeback system high address register 164 and the query writeback system low address register 166. If the writeback is successful, the managed device 130 may issue a posted write operation to write a status of the query to indicate a successful query. In some implementations, the managed device 130 may issue an interrupt after the status is written back to the control system 110, such that the control system 110 may access the query data 142 from the allocated memory 120. The interrupt may be a message signaled interrupt (MSI) or any other suitable interrupt mechanism.

In another example, upon receiving the posted write command, the managed device 130 accesses data in the query command register 174 to decode the command sent by the processor 112. In response to determining that the command is a multiple read command, the managed device 130 may access data stored in the query address register 168 to determine a starting address of the query data 142. Based on the address, the managed device 130 then queries the device memory 134, e.g., using a DMA command, to read the query data 142 and its subsequent locations. The number of incremental addresses is determined from the query command register 174. After obtaining the data block starting at query data 142, the managed device 130 issues several posted write operations to write the query data block to the allocated memory 120 starting at the address data stored in the query writeback system high address register 164 and the query writeback system low address register 166. If the writeback is successful, the managed device 130 may issue a posted write operation to write a status of the query to indicate a successful query. In some implementations, the managed device 130 may issue an interrupt after the status is written back to the control system 110, such that the control system 110 may access the query data 142 from the allocated memory 120. The interrupt may be a message signaled interrupt (MSI) or any other suitable interrupt mechanism.

The above two examples can also be used in a similar manner when the processor 112 wishes to write data or data blocks starting at device query data 130. The sequence remains identical except that the processor 112 issues PIO writes to the query data register 172, or the managed device 130 issues non-posted memory reads to the allocated memory 120 to fetch the data or data blocks and populate the query data register 172.

In general, when the managed device 130 detects an operational error or other types of errors, the interrupt writeback registers 180 enable the managed device 130 to writeback exception code(s) back to the control system 110. The managed device 130 may then issue an interrupt signal to the control system 110, such that the control system 110 may read and interpret the exception code from the allocated memory 120 without issuing a non-posted read operation to obtain the exception code from the managed device 130. This approach is advantageous when PCIe protocol is used because the root complex 114 may recognize only a limited number of exceptions, e.g., 8, through MSI. By writing the exception code back in the control system 110, the control system 110 may implement a higher number of exceptions for different scenarios. The interrupt writeback registers 180 include an interrupt writeback enable register 182, an interrupt writeback system high address register 184, and an interrupt writeback system low address register 186.

The interrupt writeback enable register 182 indicates whether the interrupt writeback capability is enabled on the managed device 130. The data value in the interrupt writeback enable register 182 may be defined by a posted write operation issued by the control system 110, or may be defined through an API command. If the managed device 130 accesses the interrupt writeback enable register 182 and determines that the interrupt writeback is disabled, the managed device 130 would not perform a posted write operation to write an exception code back to the control system 110. In some implementations, the managed device 130 may instead issue a MSI that the root complex 114 may recognize.

The interrupt writeback system high address register 184 indicates a higher portion of the system address for writing back an exception code. The data value in the interrupt writeback system high address register 184 may be defined by a posted write operation issued by the control system 110, or may be defined through an API command. Similarly, the interrupt writeback system low address register 186 indicates a lower portion of the system address for writing back the exception code(s). The data value in the interrupt writeback system low address register 186 may be defined by a posted write operation issued by the control system 110, or may be defined through an API command. In some other implementations, if the control system 110 is running on a 32-bit operating system, only the interrupt writeback system low address register 186 would need to be defined and not the interrupt writeback system high address register 184.

As an example to illustrate an interrupt writeback sequence, the control system 110 may first enable interrupt writeback by writing data in the interrupt writeback enable register 182 that would enable an interrupt writeback on the managed device 130. The control system 110 may then program the interrupt writeback system high address register 184 and the interrupt writeback system low address register 186 to set the system address of the allocated memory 120 for storing the exception code. When the managed device 130 encounters an exception, the managed device 130 issues a posted write operation to write all pending exception codes to the allocated memory 120 based on the address data stored in the interrupt writeback system high address register 184 and the interrupt writeback system low address register 186. The managed device 130 then issues a MSI notifying the control system 110 of the exception. Upon receiving the MSI, the control system 110 retrieves the exception code from the allocated memory 120, and manages the corresponding exception accordingly. After the control system 110 manages the exception, the control system 110 may issue a PCIe operation to the managed device 130 to clear the exception(s).

In general, the periodic writeback registers 190 enable the managed device 130 to periodically write data, e.g., status data 146, back to the control system 110, such that the control system 110 may access the status data 146 from the allocated memory 120 without periodically issuing a non-posted read operation to obtain the status data 146 from the managed device 130. For example, a control system may be programmed to periodically poll the status of network ports on a network switch. Writing back the network port status to the control system periodically may reduce latency and improve overall performance. The periodic writeback registers 190 include a periodic writeback enable register 192, a periodic writeback system high address register 194, a periodic writeback system low address register 196, a periodic writeback address register 198, and a periodic writeback timer register 199.

The periodic writeback enable register 192 indicates whether the periodic writeback capability is enabled on the managed device 130. The data value in the periodic writeback enable register 192 may be defined by a posted write operation issued by the control system 110, or may be defined through an API command. If the managed device 130 accesses the periodic writeback enable register 192 and determines that the periodic writeback is disabled, the managed device 130 would not perform periodic posted write operations to write the updated status data 146 back to the control system 110.

The periodic writeback system high address register 194 indicates a higher portion of the system address for writing back the status data 146. The data value in the periodic writeback system high address register 194 may be defined by a posted write operation issued by the control system 110, or may be defined through an API command. Similarly, the periodic writeback system low address register 196 indicates a lower portion of the system address for writing back the status data 146. The data value in the periodic writeback system low address register 196 may be defined by a posted write operation issued by the control system 110, or may be defined through an API command. In some other implementations, if the control system 110 is running on a 32-bit operating system, only the periodic writeback system low address register 196 would need to be defined and not the periodic writeback system high address register 194.

The periodic writeback address register 198 indicates an address of the status data 146 in the device memory 134. The data value in the periodic writeback address register 198 may be defined by a posted write operation issued by the control system 110, or may be defined through an API command. As described in more detail in reference to FIG. 2, in some implementations, the address stored in the periodic writeback address register 198 may be mapped to an address in a PCIe-space address map. In some other implementations, the address stored in the periodic writeback address register 198 may be mapped to an address in an application-space address map. In some implementations, instead of being stored in the device memory 134, the status data 146 may be determined by the managed device 130 by issuing a command to another component directly. For example, if the managed device 130 is a network switch, the managed device 130 may probe a network port directly, e.g., issue a ping command, to determine a status of the network port.

The periodic writeback timer register 199 indicates a timer value for updating the status data 146 to the control system 110. The data value in the periodic writeback timer register 199 may be defined by a posted write operation issued by the control system 110, or may be defined through an API command.

As an example to illustrate a periodic writeback sequence, the control system 110 may first enable periodic writeback by writing data in the periodic writeback enable register 192 that would enable a periodic writeback on the managed device 130. The control system 110 may then program the periodic writeback system high address register 194 and the periodic writeback system low address register 196 to set the system address of the allocated memory 120 for storing the status data 146. The control system 110 may then program the periodic writeback address register 198 to set the address of the status data 146, if the status data 146 is stored in the device memory 134. The address may be mapped in a PCIe-space address map or an application-space address map. The control system 110 may then program the periodic writeback timer register 199 to specify a timer value for updating the status data 146.

Upon determining that the periodic writeback is enabled, the managed device 130 starts a timer based on the timer value stored in the periodic writeback timer register 199, and waits for an expiration of the timer. Upon the expiration of the timer, the managed device 130 issues a posted write operation to write the status data 146 back to the allocated memory 120 based on the system address stored in the periodic writeback system high address register 194 and the periodic writeback system low address register 196. The control system 110 may then read the status data 146 from the allocated memory 120 periodically. After writing back the status data 146, the managed device 130 restarts the timer and repeats the process until the periodic writeback is disabled.

Although not shown in FIG. 1D, in some implementations, not all registers disclosed in this example may be required. For example, a managed device may not require periodic update of a status, and therefore the periodic writeback registers 190 would not be required. As another example, if the control system runs on a 32-bit operating system, the high address registers, e.g., the query writeback system high address register 164, the interrupt writeback system high address register 184, and the periodic writeback system high address register 194 would not be required.

Moreover, in some implementations, more registers than the registers disclosed in this example may be required. For example, a managed device may be configured to process two query writeback operations in parallel, and an additional set of the query writeback registers 160 would be required. The number, the size, the address scheme, the address mapping, and other properties of the writeback registers 140 may be defined using an API.

Figure 2:
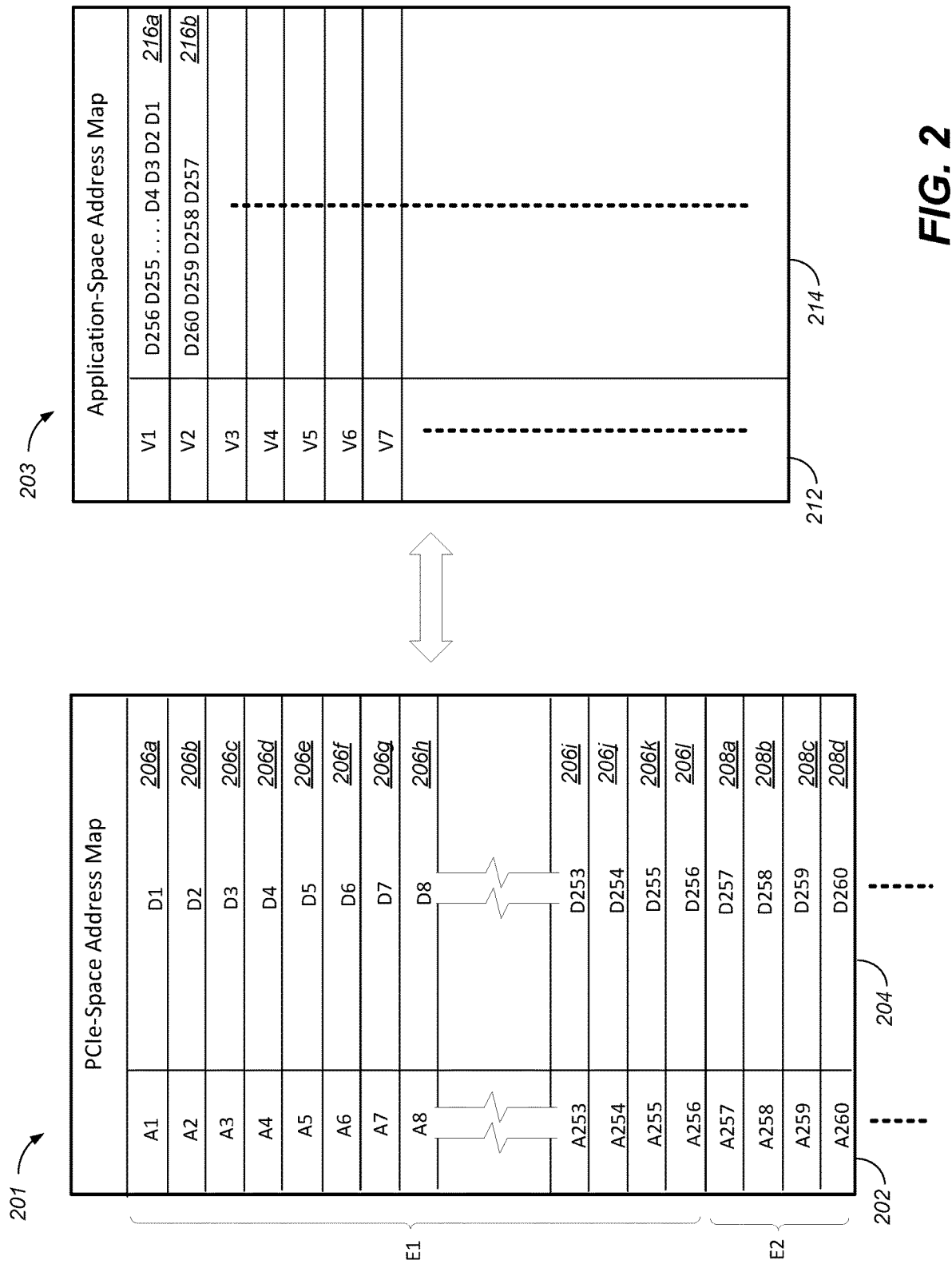
FIG. 2 illustrates two example address mapping schemes.

FIG. 2 illustrates an example PCIe-space address map 201 and an example application-space address map 203. The PCIe-space address map 201 includes a physical address column 202 and a corresponding data column 204, and the PCIe-space address map 201 includes at least fixed words 206a-206l and 208a-208d. Each fixed word has a fixed length, e.g., 4 bytes. For example, the fixed word 206a has a mapped address of A1, e.g., 0x00000000 and a value of D1 that is between 0 to $2^{32}$-1. As another example, the fixed word 206b has a mapped address of A2, e.g., 0x00000004 and a value of D2 that is between 0 to $2^{32}$-1. In general, the PCIe-space address map 201 may not be optimal for all applications. In this example, if the PCIe-space address map 201 uses a 4-byte increment for each address, it would be inefficient and cumbersome to manage 256 PCIe addresses, e.g., A1-A256, for a single 1024-byte ACL entry, e.g., E1. Moreover, it is generally desirable to keep a size of a base address register (BAR) small. In this example, under the PCIe-space address map scheme 201, a first entry, e.g., 216a, may have a starting PCIe address A1 of 0x0000000 and mapped to entry E1, while the next entry 208a may have a starting PCIe address A257 of 0x00001000 and mapped to E2. In addition, each entry stored in a managed device may have different sizes. In this example, an entry E1 may have a size of 1024 bytes, while an entry E2 may have a size of 16 bytes. The PCIe address mapping scheme therefore may not be optimal for tracking different entries stored in the managed device as the device address map becomes cumbersome to maintain and be accessed by a system application. An increase in the size of 216a by 1 byte would disrupt the entire PCIe address map.

The application-space address map 203 maps variable-sized entries to an application address space that may be accessed by an API. The application-space address map 203 includes a virtual address column 212 and a corresponding data column 214, and the address-space address map 203 includes at least variable sized entries 216a and 216b. An API may enable a user to issue a single data access operation to write, read, or access a variable-sized entry. In this example, a user may read the entry 216a by issuing a read command through the API to access virtual address V1. In some implementations, a runtime environment for the API that runs in a control system may map the single entry 216a in the application-space address map 203 to 256 addresses A1-A256 for fixed words 206a-206l in the PCIe-space address map 201. The runtime environment may instruct the processor of a control system, e.g., the processor 112, to issue 256 posted write operations to the managed device 130. In some other implementations, the processor of the control system may issue a posted write operation to access data stored in virtual address V1. A runtime environment for the API that runs in a managed device may map the single entry 216a in the application-space address map 203 to 256 addresses A1-A256 for fixed words 206a-206l in the PCIe-space address map 201. The runtime environment may instruct the managed device to issue 256 posted write operations to write the entry V1 back to the control system.

Figure 3:
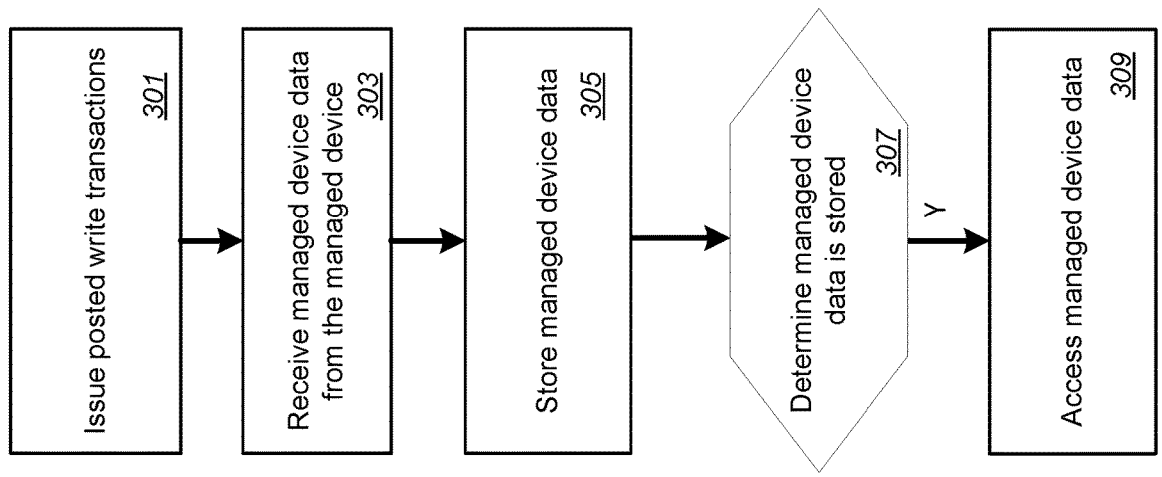
FIG. 3 is a flowchart of an example process for accessing data.

FIG. 3 is a flowchart of an example process 300 for accessing data. The process 300 may be performed by a system such as the control system 110. The system issues, via an interconnect interface to a managed device, one or more posted write operations (301). For example, referring to FIG. 1A, the processor 112 may issue, via the PCIe interface 116, one or more posted write operations to the managed device 130. The interconnect interface of the control system may be a peripheral component interconnect express (PCIe) root complex, and the one or more posted write operations may be one or more PCIe posted write operations. In some implementations, the system may issue the one or more PCIe posted write operations in response to receiving a read command issued via an application programming interface by an application that manages a network switching control scheme implemented on the managed device.

In some implementations, the system may issue first one or more posted write operations to the managed device to write a system address of the system memory to one or more system address registers of the managed device, where the system address corresponds to a starting address of the predetermined section of the system memory. For example, referring to FIG. 1A and FIG. 1D, the control system 110 may program the query writeback system high address register 164 and the query writeback system low address register 166 to set the system address of the allocated memory 120 for storing the query data 142. As another example, the control system 110 may program the interrupt writeback system high address register 184 and the interrupt writeback system low address register 186 to set the system address of the allocated memory 120 for storing an exception code. As another example, the control system 110 may program the periodic writeback system high address register 194 and the periodic writeback system low address register 196 to set the system address of the allocated memory 120 for storing the status data 146.

In some implementations, the system address of the system memory may have a first length. For example, the control system 110 may run on a 64-bit operating system while the managed device 130 may run on a 32-bit operating system. The system may issue a first posted write operation to the managed device to write a first portion of the system address to a first system address register of the one or more system address registers, and issue a second posted write operation to the managed device to write a second portion of the system address to a second system address register of the one or more system address registers. For example, referring to FIG. 1A and FIG. 1D, the control system 110 may issue two posted write operations to write data in the query writeback system high address register 164 and the query writeback system low address register 166.

In some implementations, the system may issue a posted write operation to the managed device to write writeback enable data to the managed device, where the writeback enable data may indicate whether a posted write operation to write the managed device data by the managed device to the system memory is enabled. For example, referring to FIG. 1A and FIG. 1D, the control system 110 may enable query writeback by writing data in the query writeback enable register 162 that would enable a query writeback on the managed device 130. As another example, the control system 110 may enable interrupt writeback by writing data in the interrupt writeback enable register 182 that would enable an interrupt writeback on the managed device 130. As another example, the control system 110 may enable periodic writeback by writing data in the periodic writeback enable register 192 that would enable a periodic writeback on the managed device 130.

The system receives, by the interconnect interface, managed device data sent by the managed device in response to the managed device receiving the one or more posted write operations (303). For example, referring to FIG. 1A, the control system 110 may receive the data 136 through the PCIe interface 116.

The system stores, by the interconnect interface and to a predetermined section of a system memory of the control system, the managed device data (305). For example, referring to FIG. 1A, the PCIe interface 116 may store the data 136 in the allocated memory 120.

The system determines, that the managed device data is stored in the predetermined section of the system memory (307). For example, referring to FIG. 1A and FIG. 1D, the managed device 130 may issue an interrupt after the status is written back to the control system 110, such that the control system 110 may determine that the managed device data is stored in the predetermined section of the system memory.

In response to determining that the managed device data is stored in the predetermined section of the system memory, the system accesses the managed device data stored in the predetermined section of the system memory, whereby a latency associated with accessing the managed device data from the predetermined section of the system memory by the processor via the interconnect interface is lower than a latency associated with accessing the managed device data by the processor by issuing a non-posted read operation via the interconnect interface to the managed device (309). For example, referring to FIG. 1A, the processor 112 may read the data 136 from the allocated memory 120. As described in reference to FIGS. 1B and 1C, the aggregated latency associated with posted write operations is lower than the aggregated latency associated with posted read operations.

In some implementations, the system may receive, by the processor and from the managed device, an interrupt operation. In response to receiving the interrupt operation, the system may access, by the processor, the managed device data stored in the predetermined section of the system memory. For example, referring to FIG. 1A and FIG. 1D, the managed device 130 may issue an interrupt after the status is written back to the control system 110, such that the control system 110 may access the query data 130 from the allocated memory 120.

In some implementations, the predetermined section of the system memory may be designated for storing the managed device data representing an interrupt code sent by the managed device in response to an exception in the managed device. For example, referring to FIG. 1A and FIG. 1D, when the managed device 130 encounters an exception, the managed device 130 may issue a posted write operation to write the corresponding exception code to the allocated memory 120 based on the address data stored in the interrupt writeback system high address register 184 and the interrupt writeback system low address register 186. After accessing the managed device data stored in the predetermined section of the system memory, the system may determine, by the processor and based on the interrupt code, the exception in the managed device. For example, referring to FIG. 1A and FIG. 1D, the control system 110 may retrieve the exception code from the allocated memory 120, and manage the corresponding exception accordingly.

In some implementations, the system may access, by the processor, the managed device data stored in the predetermined section of the system memory periodically based on a predetermined timer value. For example, referring to FIG.

1A and FIG. 1D, the control system 110 may read the status data 146 from the allocated memory 120 periodically.

In some implementations, the system may access, by the processor, a status section of the system memory to obtain status data. For example, referring to FIG. 1A and FIG. 1D, if the query data writeback is successful, the managed device 130 may issue a posted write operation to write a status of the query to indicate a successful query. The system may determine, based on the status data, that the managed device data is available in the predetermined section of the system memory. For example, referring to FIG. 1A and FIG. 1D, if the control system 110 determines that a query is successful based on the writeback status. In response to determining that the managed device data is available in the predetermined section of the system memory, the system may access the managed device data stored in the predetermined section of the system memory. For example, referring to FIG. 1A and FIG. 1D, in response to determining that the query data 142 is available in the allocated memory 120, the processor may access the query data 142 from the allocated memory 120.

Figure 4:
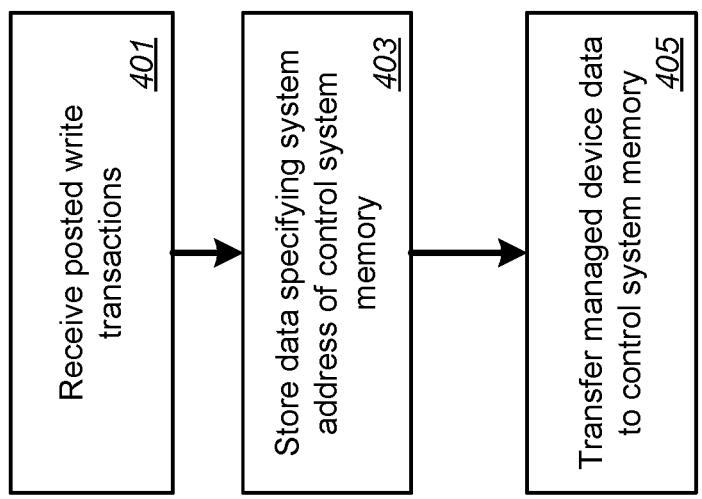
FIG. 4 is a flowchart of an example process for writing back data.

FIG. 4 is a flowchart of an example process 400 for writing back data to a control system. The process 400 may be performed by a system such as the managed device 130. The system receives, from a control system, one or more posted write operations directed to the one or more control registers (401). For example, referring to FIG. 1A, the managed device 130 receives from a PCIe interface 116 of a control system 110, one or more posted write operations.

Based on the one or more posted write operations, the system stores in the one or more control registers, data specifying at least a system address of a system memory of the control system, where the system address corresponds to a starting address of a predetermined section of the system memory (403). For example, referring to FIG. 1A and FIG. 1D, the managed device 130 may store the system address of the allocated memory 120 to the query writeback system high address register 164 and the query writeback system low address register 166. As another example, the managed device 130 may obtain the system address of the allocated memory 120 from the interrupt writeback system high address register 184 and the interrupt writeback system low address register 186. As another example, the managed device 130 may obtain the system address of the allocated memory 120 from the periodic writeback system high address register 194 and the periodic writeback system low address register 196.

The system transfers managed device data from the memory storage to the predetermined section of the system memory of the control system by issuing, to the control system and based on the system address of the system memory, one or more posted write operations to write the managed device data to the predetermined section of the system memory (405). For example, referring to FIG. 1A, the managed device 130 issues one or more posted write operations to the PCIe interface 116 to write the data 136 to the allocated memory 120.

In some implementations, the system may receive a posted write operation to write, to a query address register, a data address of a memory location in the managed device where the managed device data is stored. For example, referring to FIG. 1A and FIG. 1D, the control system 110 may program the query address register 168 to set the address of the query data 142 in the device memory 134.

In some implementations, the system may receive a posted write operation to write, to a command register of the managed device, command data. For example, referring to FIG. 1A and FIG. 1D, the control system 110 may program the query command register 174 to specify a read, write, or other commands. The system may obtain the command data stored in the command register. For example, the managed device 130 may access data in the query command register 174 to determine the command sent by the processor 112. The system may determine that the command data corresponds to a read command. For example, the managed device 130 may determine that the command data corresponds to a read command. In response to determining that the command data corresponds to a read command, the system may access the data address stored in the query address register. For example, in response to determining that the command is a read command, the managed device 130 may access data stored in the query address register 168 to determine an address of the query data 142. The system may retrieve the managed device data based on the data address. For example, based on the address, the managed device 130 then queries the device memory 134, e.g., using a DMA command, to read the query data 142.

In some implementations, based on the system address, the system may issue one or more posted write commands to write the managed device data to the predetermined section of the system memory. For example, referring to FIG. 1A and FIG. 1D, after obtaining the query data 142, the managed device 130 may issue a posted write operation to write the query data 142 to the allocated memory 120 based on the address data stored in the query writeback system high address register 164 and the query writeback system low address register 166.

In some implementations, based on the data address, the system may identify multiple physical data addresses that correspond to multiple memory locations where different portions of the managed device data are stored. For example, referring to FIG. 2, a runtime environment for the API that runs in a managed device may map the single entry 216a in the application-space address map 203 to 256 addresses A1-A256 for fixed words 206a-2061 in the PCIe-space address map 201. The system may issue multiple posted write operations to write consecutively the different portions of the managed device data to different addresses in the predetermined section of the system memory. For example, the runtime environment may instruct the managed device to issue 256 posted write operations to write the entry E1 back to the control system.

In some implementations, after issuing the one or more posted write operations, the system may issue an interrupt operation to the interconnect interface of the control system. For example, referring to FIG. 1A and FIG. 1D, the managed device 130 may issue an interrupt after the status is written back to the control system 110, such that the control system 110 may access the query data 130 from the allocated memory 120.

In some implementations, the managed device data may include data indicating an exception in the managed device. For example, referring to FIG. 1A and FIG. 1D, when the managed device 130 encounters an exception, the managed device 130 may issue a posted write operation to write the corresponding exception code to the allocated memory 120 based on the address data stored in the interrupt writeback system high address register 184 and the interrupt writeback system low address register 186.

In some implementations, the one or more posted write operations received from the interconnect interface of the control system may include a posted write operation for writing a timer value in a writeback timer register of the managed device. For example, referring to FIG. 1A and FIG.

1D, the control system 110 may program the periodic writeback timer register 199 to specify a timer value for updating the status data 146. In response to receiving the posted write operation for writing the timer value in the writeback timer register, the system may write the timer value in the writeback timer register. For example, in response to receiving a posted write operation to update a timer value in the periodic writeback timer register 199, the managed device 130 may write the timer value in the periodic writeback timer register 199. The system may issue posted write operations to write the managed device data to the predetermined section of the system memory periodically based on the timer value. For example, upon determining that the periodic writeback is enabled, the managed device 130 may start a timer based on the timer value stored in the periodic writeback timer register 199, and waits for an expiration of the timer. Upon the expiration of the timer, the managed device 130 issues a posted write operation to write the status data 146 back to the allocated memory 120 based on the system address stored in the periodic writeback system high address register 194 and the periodic writeback system low address register 196.

In some implementations, the incrementing PCIe address nature of the query writeback registers 160 as described in reference to FIG. 1D allows for a further optimization of PCIe bandwidth through write-combining. For example, each Programmed 10 write transaction triggers a separate posted write PCIe packet. The control system 110 may allow the root complex 114 to combine each of the separate PIO write transactions to form a single or a fewer number of PCIe memory write packets, providing that each subsequent PIO write is to an incrementing PCIe address. The general bandwidth savings can be large considering that a PCIe header overhead for a 4-byte write can be of the order of 300%.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable combination.

Similarly, while operations are depicted in the drawings in a particular order, this should not be understood as requiring that such operations be performed in the particular order shown or in sequential order, or that all illustrated operations be performed, to achieve desirable results.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Thus, particular embodiments have been described. Other embodiments are within the scope of the following claims. For example, the actions recited in the claims may be performed in a different order and still achieve desirable results.

What is claimed is:

1. A system comprising:
one or more computers comprising:
a processor;
a memory;
an interconnect interface configured to provide:
a first interconnect path from the processor to the memory through the interconnect interface;
a second interconnect path from the processor to a managed device through the interconnect interface; and
a third interconnect path that is switchable for communication from the managed device to the processor or from the managed device to the memory through the interconnect interface; and
a computer-readable medium having stored thereon instructions that, when executed by the one or more computers, cause the one or more computers to perform operations comprising:
receiving, at the interconnect interface, a read command from the processor to read managed device data stored in the managed device;
issuing, by the interconnect interface via the second interconnect path to the managed device, one or more instructions corresponding to posted write operations in response to receiving the read command from the processor, wherein the one or more instructions include command data corresponding to the read command and data addresses of a plurality of memory locations in the managed device where different portions of the managed device data are stored;
in response to the managed device receiving the one or more instructions corresponding to posted write operations, receiving, at the interconnect interface via the third interconnect path from the managed device to the memory, the different portions of the managed device data in a plurality of posted write operations;
storing, in a predetermined section of the memory, the managed device data including the different portions of the managed device data;
determining that the managed device data is stored in the predetermined section of the memory; and
in response to determining that the managed device data is stored in the predetermined section of the memory, accessing, via the first interconnect path, the managed device data stored in the predetermined section of the memory.

2. The system of claim 1, wherein issuing the one or more instructions corresponding to posted write operations further comprises issuing one or more instructions to the managed device to write a system address of the memory to one or more system address registers of the managed device, wherein the system address corresponds to a starting address of the predetermined section of the memory.

3. The system of claim 2,
wherein the system address of the memory has a first length, and
wherein issuing the one or more instructions corresponding to posted write operations to the managed device further comprises:
issuing a first instruction to the managed device to write a first portion of the system address to a first system address register of the one or more system address registers; and
issuing a second instruction to the managed device to write a second portion of the system address to a second system address register of the one or more system address registers.

4. The system of claim 1,
wherein issuing the one or more instructions corresponding to posted write operations further comprises issuing an instruction to the managed device to write, to the managed device, a data address of a memory location of the managed device where a portion of the managed device data is stored.

5. The system of claim 4,
wherein issuing the one or more instructions corresponding to posted write operations further comprises issuing another instruction to the managed device to write, to the managed device, the command data that, when retrieved by the managed device, causes the managed device to perform operations of:
determining that the command data corresponds to the read command;
in response to determining that the command data corresponds to the read command, accessing the data address stored in the managed device;
retrieving the portion of the managed device data corresponding to the data address;
accessing a system address stored in the managed device; and
based on the system address, performing a posted write operation to write the portion of the managed device data to the predetermined section of the memory.

6. The system of claim 1,
wherein issuing the one or more instructions corresponding to posted write operations further comprises issuing an instruction to the managed device to write writeback enable data to the managed device, wherein the writeback enable data indicates whether a posted write operation to write the managed device data by the managed device to the memory is enabled.

7. The system of claim 1, wherein the operations further comprise:
receiving, by the processor and from the managed device, an interrupt operation.

8. The system of claim 7,
wherein a portion of the predetermined section of the memory is designated for storing an interrupt code sent by the managed device in response to an exception in the managed device, and
wherein the operations further comprise:
after receiving the interrupt operation, accessing the interrupt code stored in the portion of the predetermined section of the memory; and
determining, based on the interrupt code, what the exception is that occurred in the managed device.

9. The system of claim 1, wherein accessing the managed device data stored in the predetermined section of the memory further comprises periodically accessing, by the processor, the managed device data stored in the predetermined section of the memory based on a predetermined timer value.

10. The system of claim 1, wherein determining that the managed device data is stored in the predetermined section of the memory further comprises:
accessing, by the processor, a status section of the memory to obtain status data; and
determining, based on the status data, that the managed device data is available in the predetermined section of the memory.

11. The system of claim 1, wherein the memory includes a system memory, a cache that is separate from the system memory, or a cache that is a part of the system memory.

12. The system of claim 1,
wherein the interconnect interface is a peripheral component interconnect express (PCIe) root complex, and
wherein the posted write operations include are one or more PCIe posted write operations.

13. The system of claim 12,
wherein issuing the one or more instructions corresponding to posted write operations further comprises issuing the one or more instructions corresponding to PCIe posted write operations in response to the system executing the read command that is specified by an application programming interface, wherein the read command is called by an application that manages a network switching control scheme implemented on the managed device.

14. The system of claim 1, wherein issuing the one or more instructions corresponding to posted write operations in response to the read command from the processor comprises:
in response to receiving the read command, preparing the one or more posted write operations, wherein each posted write operation of the one or more posted write operations specifies a posted write command to write, to one or more registers of the managed device, one or more memory addresses corresponding to the predetermined section of the memory; and
sending, to the managed device, the one or more instructions corresponding to the posted write operations.

15. The system of claim 14, wherein receiving the managed device data comprises:
receiving, at the interconnect interface, one or more additional posted write operations from the managed device, wherein each additional posted write operation of the one or more additional posted write operations specifies a memory address of the one or more memory addresses stored in the one or more control registers and a portion of the managed device data to write to the memory address; and
in response to the one or more additional posted write operations, causing the interconnect interface to:
read the managed device data from the managed device, and
write the managed device data in the predetermined section of the memory, the managed device data being written to the one or more memory addresses corresponding to the predetermined section of the memory.

16. The system of claim 1, wherein a latency corresponding to the first interconnect path is lower than a latency corresponding to the second interconnect path.

17. A managed device comprising:
memory storage;
one or more control registers; and
circuitry to perform operations comprising:
- receiving, from a control system through a first interconnect path, one or more instructions corresponding to posted write operations directed to the one or more control registers, wherein the one or more instructions include command data corresponding to a read command and data addresses of a plurality of memory locations in the managed device where different portions of managed device data to be read are stored;
- based on the one or more instructions, storing, in the one or more control registers, data specifying at least a system address of a memory of the control system, wherein the system address corresponds to a starting address of a predetermined section of the memory of the control system; and
- transferring managed device data from the memory storage to the predetermined section of the memory of the control system by:
  - identifying multiple physical data addresses that correspond to multiple memory locations in the managed device where the different portions of the managed device data are stored,
  - issuing, to the control system through a second interconnect path and based on the system address of the memory, a plurality of posted write operations to write consecutively the different portions of the managed device data to different addresses in the predetermined section of the memory, wherein the second interconnect path connects the managed device to the memory of the control system, and
  - wherein the managed device data is accessible, from the predetermined section of the memory, by a processor using a third interconnect path through the control system.

18. The managed device of claim 17, wherein a latency corresponding to accessing the managed device data from the predetermined section of the memory by a processor of the control system is lower than a latency corresponding to accessing the managed device data by the processor by issuing a non-posted read operation to the managed device.

19. The managed device of claim 17,
wherein receiving the one or more instructions corresponding to posted write operations further comprises receiving an instruction to write, to a query address register of the managed device, a data address of a memory location in the managed device where a portion of the managed device data is stored.

20. The managed device of claim 19,
wherein receiving the one or more instructions corresponding to posted write operations further comprises receiving an instruction to write, to a command register of the managed device, the command data, and
wherein the operations further comprise:
  - obtaining the command data stored in the command register; and
  - determining that the command data corresponds to a read command,
wherein transferring the managed device data further comprises:
  - in response to determining that the command data corresponds to a read command, accessing the data address stored in the query address register; and
  - retrieving the managed device data based on the data address.

21. The managed device of claim 20, wherein the operations further comprise:
based on the data address and an address map, identifying the multiple physical data addresses that correspond to the multiple memory locations where different portions of the managed device data are stored.

22. The managed device of claim 17, wherein the operations further comprise:
after issuing the one or more posted write operations, issuing an interrupt operation to the control system.

23. The managed device of claim 17,
wherein the one or more instructions corresponding to posted write operations includes an instruction for writing a timer value in a writeback timer register of the managed device,
wherein the operations further comprise:
  - in response to receiving the instruction for writing the timer value in the writeback timer register, writing the timer value in the writeback timer register, and
wherein issuing the one or more posted write operation to write the managed device data to the predetermined section of the memory further comprises periodically issuing posted write operations to write the managed device data to the predetermined section of the memory based on the timer value.

24. A non-transitory computer-readable medium storing a computer program, the computer program comprising instructions that, when executed by a managed device, cause the managed device to perform operations comprising:
- receiving, from an interface of a control system through a first interconnect path, one or more instructions corresponding to posted write operations directed to one or more control registers of the managed device, wherein the one or more instructions include command data corresponding to a read command and data addresses of a plurality of memory locations in the managed device where different portions of managed device data to be read are stored;
- based on the one or more instructions, storing, in the one or more control registers, data specifying at least a system address of a memory of the control system, wherein the system address corresponds to a starting address of a predetermined section of the memory of the control system; and
- transferring managed device data from a memory storage of the managed device to the predetermined section of the memory of the control system by:
  - identifying multiple physical data addresses that correspond to multiple memory locations in the managed device where the different portions of the managed device data are stored,
  - issuing, to the interface of the control system through a second interconnect path and based on the system address of the memory, a plurality of posted write operations to write consecutively the different portions of the managed device data to different addresses in the predetermined section of the memory, wherein the second interconnect path connects the managed device to the memory of the control system, and
  - wherein the managed device data is accessible, from the predetermined section of the memory, by a processor using a third interconnect path through the interface of the control system.

25. A non-transitory computer-readable medium storing a computer program, the computer program comprising instructions that when executed by a control system, cause the control system to perform operations comprising:
    receiving, from a processor, a read command to read managed device data stored in a managed device;
    issuing, via a first interconnect path to the managed device, one or more instructions corresponding to posted write operations in response to receiving the read command from the processor, wherein the one or more instructions include command data corresponding to the read command and data addresses of a plurality of memory locations in the managed device where different portions of the managed device data are stored;
    in response to the managed device receiving the one or more instructions corresponding to posted write operations, receiving, via a second interconnect path from the managed device, the different portions of the managed device data in a plurality of posted write operations, wherein the second interconnect path connects the managed device to a memory of the control system;
    storing, in a predetermined section of the memory, the managed device data, including the different portions of the managed device data;
    determining, by the processor, that the managed device data is stored in the predetermined section of the memory; and
    in response to determining that the managed device data is stored in the predetermined section of the memory, accessing, by the processor via a third interconnect path from the processor to the memory, the managed device data stored in the predetermined section of the memory.

26. The non-transitory computer-readable medium of claim 25, wherein a latency corresponding to the third interconnect path is lower than a latency corresponding to the first interconnect path.

27. A computer-implemented method for managing data transfer, the method comprising:
    receiving, at an interconnect interface of a control system, a read command from a processor of the control system to read managed device data stored in a managed device coupled to the control system;
    issuing, by the interconnect interface via a first interconnect path between the processor and the managed device, one or more instructions corresponding to posted write operations in response to receiving the read command from the processor, wherein the one or more instructions include command data corresponding to the read command and data addresses of a plurality of memory locations in the managed device where different portions of the managed device data are stored;
    in response to the managed device receiving the one or more instructions corresponding to posted write operations, receiving, at the interconnect interface via a second interconnect path from the managed device, the different portions of the managed device data in a plurality of posted write operations, wherein the second interconnect path connects the managed device and a memory of the control system;
    storing, in a predetermined section of the memory of the control system, the managed device data including the different portions of the managed device data;
    determining, by the processor, that the managed device data is stored in the predetermined section of the memory; and
    in response to determining that the managed device data is stored in the predetermined section of the memory, accessing, by the processor of the control system via a third interconnect path between the processor and the memory, the managed device data stored in the predetermined section of the memory.

28. The computer-implemented method of claim 27, wherein a latency corresponding to the third interconnect path is lower than a latency corresponding to the first interconnect path.

29. A computer-implemented method for managing data transfer, the method comprising:
    receiving, from a control system through a first interconnect path, one or more instructions corresponding to posted write operations directed to one or more control registers of a managed device, wherein the one or more instructions include command data corresponding to a read command and data addresses of a plurality of memory locations in the managed device where different portions of managed device data to be read are stored;
    based on the one or more instructions, storing, in the one or more control registers, data specifying at least a system address of a memory of the control system, wherein the system address corresponds to a starting address of a predetermined section of the memory of the control system; and
    transferring managed device data from a memory storage of the managed device to the predetermined section of the memory of the control system by:
    identifying multiple physical data addresses that correspond to multiple memory locations in the managed device where the different portions of the managed device data are stored,
    issuing, to the control system through a second interconnect path and based on the system address of the memory, a plurality of posted write operations to write consecutively the different portions of the managed device data to different addresses in the predetermined section of the memory, wherein the second interconnect path connects the managed device to the memory of the control system, and
    wherein the managed device data is accessible, from the predetermined section of the memory, by a processor using a third interconnect path through the control system.

* * * * *